April 11, 1961 P. H. HALPERN 2,979,627

TRANSISTOR SWITCHING CIRCUITS

Filed July 31, 1958

United States Patent Office 2,979,627

Patented Apr. 11, 1961

2,979,627

TRANSISTOR SWITCHING CIRCUITS

Peter H. Halpern, Falls Church, Va., assignor to International Business Machines Corporation, New York, N.Y., a corporation of New York Filed July 31, 1958, Ser. No. 752,271

10 Claims. (Cl. 307—88.5)

Figures 1, 2:
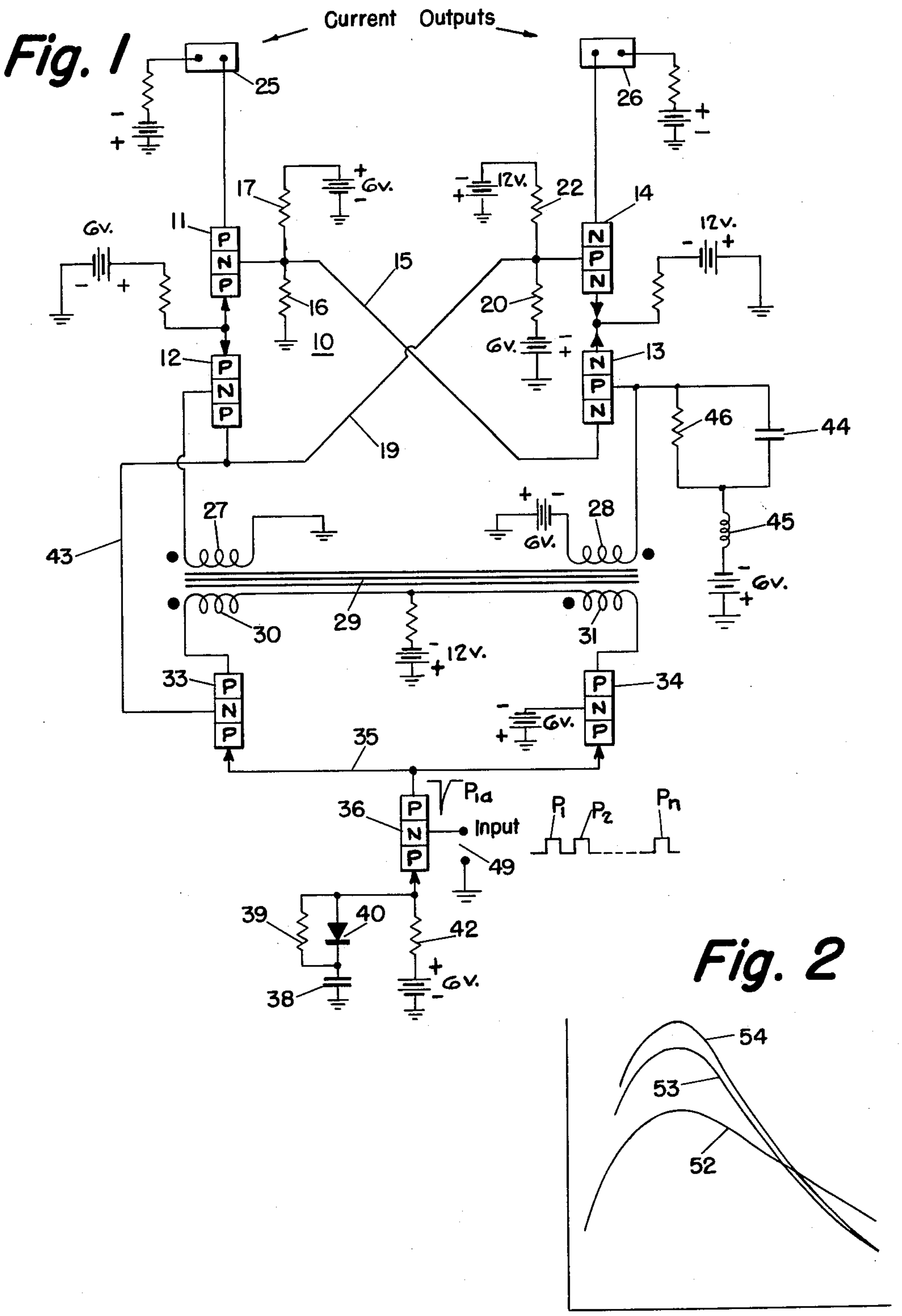

This invention relates to binary trigger circuits of the kind useful in computing apparatus and also as counting devices.

As explained in Bruce et al. Patent 2,772,370, a binary trigger circuit may be defined as one which responds to two successive impulses of the same polarity to produce a single output pulse. Each output pulse may therefore be said to count a pair of input pulses. By cascading the binary trigger circuits, each succeeding stage provides a binary count of a higher order than the preceding stage.

While binary trigger circuits have for some time been used because of their adaptability as counting devices, something has been left to be desired in speed and certainty of operation.

In accordance with the present invention, a binary trigger has been developed which will count up to a rate of 16 megacycles per second and with great dependability in that the system has a reduced response to spurious signals. More particularly, in carrying out the present invention in one form thereof, there has been utilized a transistor-controlled input transformer having a pair of primary windings and a pair of secondary windings, the latter applying control impulses to a binary flip-flop circuit which includes certain features disclosed in application Serial No. 622,307, filed November 15, 1956, by Hannon S. Yourke, entitled "Transistor Switching Circuit," now Patent No. 2,964,652. There is associated with the transformer a damping network which provides critical damping, that is to say, prevents undershoot and affords a minimum width of the input control pulse. Additionally, there is provided a transistor-controlled input circuit which may include a differentiating means which acts as a pulse sharpener. Combined with the foregoing features is a positive feedback circuit which acts to accelerate reversals of the binary trigger, a feature adding to the certainty of operation.

For further objects and advantages of the invention and for a typical embodiment thereof, reference is to be had to the following description taken in conjunction with the accompanying drawings, in which:

Fig. 1 is a circuit diagram of a binary trigger circuit in accordance with a particular form of the invention; and Fig. 2 is a graph helpful in explaining certain features of the invention.

Referring to Fig. 1, a part of the binary trigger circuit 10 is quite similar to that disclosed in Fig. 8 of the aforesaid Yourke application and comprises a PNP transistor 11 cross-connected with an NPN transistor 13. A PNP transistor 12 is cross-connected with an NPN transistor 14. The first-mentioned cross-connection formed by conductor 15 is connected through a resistor 16 to a reference potential, as ground, and through a resistor 17 to a suitable potential source, such as a 6-volt battery. The other cross-connection formed by conductor 19 is connected through a resistor 20 to another 6-volt source, and through resistor 22 to a 12-volt source, the polarities being as indicated on the drawing. From the collectors of transistors 11 and 14 there extend current output circuits 25 and 26.

The input circuits to the binary flip-flop circuit thus far described respectively include the secondary windings 27 and 28 of a transformer 29 having primary windings 30 and 31. The primary windings are connected to a current source formed by a 12-volt battery, and the primary windings are also connected to a pair of PNP gating transistors 33 and 34 having their emitters connected together by a conductor 35. To this common input conductor there is connected an input transistor 36 to which a succession of input pulses $P_1$, $P_2$ . . . $P_n$ are applied. There is associated with the emitter circuit of transistor 36 a differentiating circuit formed by capacitor 38, a resistor 39, and a unidirectional device, such as a diode 40. The current supply for the emitter of transistor 36 is illustrated as a 6-volt source, a resistor 42 being included in circuit therewith.

It will be observed that there is a feedback circuit extending from the collector of transistor 12 by way of a conductor 43 to the base of gating transistor 33. Though the damping network for the transformer may be associated with either the primary or the secondary windings, it has been illustrated as associated with secondary winding 28. The damping network comprises a capacitor 44, an inductance 45, and a resistor 46. The damping network is connected to a current source illustrated by a 6-volt battery. The circuit components forming the damping network are selected to provide critical damping for purposes later to be described.

It will now be assumed that the pulses $P_1$, $P_2$ . . . $P_n$ are applied in succession to the input circuit indicated by the input terminals 49. It will be further assumed that the transistor 34 is in its conductive state. This transistor will normally be conductive by reason of the base of transistor 33 being biased more positively than —6 volts and the connection of the base of transistor 34 to a biasing potential indicated by a 6-volt battery. The positive-going pulse $P_1$ as applied to transistor 36 of the PNP type renders it non-conductive, and through the action of the differentiating circuit 38—40 produces at the output a peaked negative current pulse $P_{1a}$. The magnitude of the negative current pulse $P_{1a}$ applied to the emitters of transistors 33 and 34 renders the latter non-conductive. Current flow through the transformer windings 31 is interrupted. The secondary windings 27 and 28 are so poled with reference to their primary windings 30 and 31 that they produce output pulses of the same polarity, that is to say, the windings 27 and 28 apply positive-going pulses to the respective bases of transistors 12 and 13.

It will be recalled that transistors 12 and 13 are of opposite types. The result is that the output from windings 27 and 28 turns transistor 13 on and turns transistor 12 off. When transistor 13 is turned on, it acts through the cross-connection 15 to turn transistor 11 on, while the transistor 12 acts through cross-connection 19 to turn transistor 14 off. Accordingly, there are changes in the output levels produced at the output circuits 25 and 26. As transistor 12 is turned off, there appears at its output circuit a negative-going swing or level which through the feed-back circuit 43 acts in the direction to turn transistor 33 on. This aids the operation of the binary trigger in shifting from one to the other of its two states.

The transformer 29 is preferably designed or selected in view of the requirements of associated damping circuits which provide critical damping. Thus, for example, the turns ratio may be one-to-one with a magnetizing inductance of 2 microhenries for all windings. Such a transformer will be found quite satisfactory for use with the damping circuit 44—46 associated with the secondary winding 28. Such a damping network may likewise be associated with the primary windings. In that case, however, the primary windings may have an inductance of about 7.5 microhenries, while that of the secondaries may be more of the order of 1.2 microhenries. As already explained, the damping network 44—46 damps out any under-shoot following the initial positive pulse developed by the transformer winding 28 and minimizes the pulse width. Stated differently, the damping network provides a high impedance effectively in shunt with the transformer. By so providing the high impedance shunt, the pulse width will be maintained at a minimum.

The action of the damping network is qualitatively illustrated in Fig. 2, where it will be observed that resistance damping, as illustrated by the graph 52, results in a relatively wide, low amplitude pulse, while with the damping networks made up of resistance and inductance, the amplitude has been increased and pulse width has been decreased as illustrated by the graph 53. For an RCL damping network as shown in Fig. 1, there is further reduction in pulse width and a further increase in amplitude. The characteristics as illustrated by the graph 54 are optimum, though those of graph 53 can be utilized. With a transformer of the kind described above, the damping network for graph 54 comprised a resistor 46 of 530 ohms, a capacitor 44 of 33 micromicrofarads, and the inductance 45 of 4.2 microhenries. For transformers having different inductance values, those skilled in the art will understand how to calculate the changes needed in the components of the damping network to provide critical damping.

Returning now to the operation of the system, it is to be noted that the application of the pulse $P_1$ resulted in the application of the spike-type of current pulse $P_{1a}$ to the common input circuit for transistors 33 and 34. Thus, the present binary trigger is characterized by the fact that it changes state every time the current is turned off in the input transistor 36. That current is turned off transiently on every positive wave front or leading edge of the input. Since there is achieved a transient type of operation, the recovery time provided for the transformer assures adequate decay time for the flux thereof, this provision being helpful in addition to the presence of the damping network associated with that transformer.

The spike-type pulse $P_{1a}$ is achieved by the operation of the differentiating circuit 38—40 associated with input transistor 36. When transistor 36 is rendered non-conductive by the applied pulse $P_1$, the capacitor 38 charges through resistor 42 and diode 40, making the emitter more positive and thus acting in a direction to turn transistor 36 on again. When the capacitor 38 charges sufficiently, the transistor 36 turns on, notwithstanding the continued application to the base of the positive-pulse $P_1$. The negative swing of the pulse $P_1$ has negligible effect on the operation of the transistors 33 and 34 because of the current limiting effect of resistors 42 and 39.

As the next pulse $P_2$ is applied to the input circuit 49, the operations described above are repeated and, therefore, they need not be duplicated again. The same will be true for all succeeding pulses until pulse $P_n$ is applied, the last pulse of the series to be counted. Thus there will be current outputs for every other wave front, and it will be seen that there has been achieved a provision of a binary trigger of the "divide by two" type, or one which counts at high speed at the pulse repetition frequency of the applied impulses.

Those skilled in the art will understand how to select the values of the circuit components and also how to substitute for PNP transistors, transistors of opposite types, such as the NPN's, and vice vera. It may be helpful, however, to state that in one embodiment of the invention the following values for circuit components were found to be satisfactory:

| | | |
|---|---|---|
| Resistors 16 and 20 | ohms | 157 |
| Resistors 17 and 22 | | 2.3K |
| Resistor 39 | ohms | 510 |
| Resistor 42 | do | 910 |

Resistors of 910 ohms are provided in series with the current sources for the inter-connected emitters of the respective pairs of cross-connected transistors 11, 12 and 13, 14 forming the flip-flop circuit. The remaining resistors not identified by reference characters may be under 1,000 ohms, for example, 910 ohms.

With the above understanding of the invention, it will be readily understood that changes may be made in certain of the circuit arrangements, some of which have already been suggested, and that the binary trigger circuits may be cascaded in number as may be desired for any of the usual counting applications. Additionally, differentiating circuits may be utilized to provide the spike-type of input pulse to the gating transistors. Besides sharpening and shortening the length thereof, the damping circuits may function, as the damping circuit 44—46 functions, to attenuate under-shoot of any of the applied pulses in avoidance of appearance at the output circuits of undesired output signals.

What is claimed is:

1. A transiently operating trigger circuit comprising two pairs of transistors, each pair having their emitters connected together and to a source of current, each transistor of each pair having a cross-connection to a transistor of the opposite pair for changing the conductive states of said pairs, a transformer having a pair of secondary windings and a pair of primary windings, means connecting each secondary winding to an input circuit of a transistor of one of said pairs, a gating transistor connected in circuit with each said primary winding, a positive feedback circuit from a transistor of one of said pairs to one of the gating transistors, the other gating transistor connected to the other primary winding being biased in a forward direction normally to be conductive, an input transistor connected to input circuits of said gating transistors connected to said primary windings, a differentiating circuit connected to the input circuit of said input transistor for shortening the duration of applied control pulses, each wave-front of a control pulse of a given polarity transiently turning off one and then turning on the other of said gating transistors in circuit with said primary windings for transiently changing the conductive states of said pairs of transistors, and means for minimizing the recovery time for said transformer after application of a pulse thereto including a damping circuit connected to at least one of its windings for shortening the duration of the applied pulse.

2. The trigger circuit of claim 1 in which biasing means are provided for said input transistor for biasing it in the forward direction normally to be conductive and in which said differentiating circuit includes a capacitor and a resistor and a unidirectionally conductive device in parallel with each other and in series with said capacitor, said unidirectionally conductive device being connected for current flow during appearance of a wave-front which renders said input transistor non-conductive.

3. The trigger circuit of claim 1 in which said damping circuit comprises an inductance in series with a parallel branch having included therein a resistor and a capacitor.

4. A transiently operating trigger circuit comprising two pairs of switching devices, each switching device of each pair having a cross-connection to a switching device of the opposite pair for changing the conductive states of said pairs, a transformer having a pair of primary windings and a pair of secondary windings, means connecting each secondary winding to an input circuit of a switching device of one of said pairs, a gating element connected in circuit with each said primary winding, a feedback circuit from a switching device of one of said pairs to a first of said gating elements, said first gating element being normally non-conductive, the second of said gating elements connected to said other of said primary windings being normally conductive, an input switching device connected to input circuits of said gating elements, a differentiating circuit connected to the input circuit of said input switching device for shortening the duration of applied control pulses, each wave-front of a control pulse of a given polarity transiently rendering said first gating element conductive and said second gating element non-conductive, for transiently changing the conductive states of said pairs of switching devices, and means for minimizing the recovery time for said transformer after application of a pulse thereto including a damping circuit connected to at least one of its windings for introducing a damping action which shortens the duration of the applied pulse.

5. The combination of claim 4 in which said gating elements comprise gating transistors and in which said pairs of switching devices comprise cross-connected transistors.

6. The combination of claim 5 in which said input switching device comprises an input transistor.

7. The combination of claim 5 in which said input switching device comprises an input transistor, and in which said damping circuit includes a resistor and a capacitor the resistance and capacitance thereof providing said damping action.

8. The combination of claim 5 in which said pairs of cross-connected transistors comprise two transistors of one conductivity type and two transistors of an opposite conductivity type.

9. The combination of claim 8 in which said gating transistors are of the PNP type.

10. The combination of claim 5 in which two transistors forming said pairs of cross-connected switching devices are of the PNP type and two of the NPN type, and in which a positive feedback circuit extends from the base of a PNP transistor of said pairs to the base of a PNP gating transistor.

References Cited in the file of this patent

UNITED STATES PATENTS

| | | |
|---|---|---|
| 2,843,320 | Chisholm | July 15, 1958 |
| 2,845,548 | Silliman et al. | July 29, 1958 |
| 2,846,594 | Pankratz et al. | Aug. 5, 1958 |
| 2,885,574 | Roesch | May 5, 1959 |
| 2,909,680 | Moore et al. | Oct. 20, 1959 |
| 2,923,838 | Slobodzinski et al. | Feb. 2, 1960 |